C. A. WOODEN.
NUT LOCK.
APPLICATION FILED OCT. 1, 1917.
1,316,344.
Patented Sept. 16, 1919.
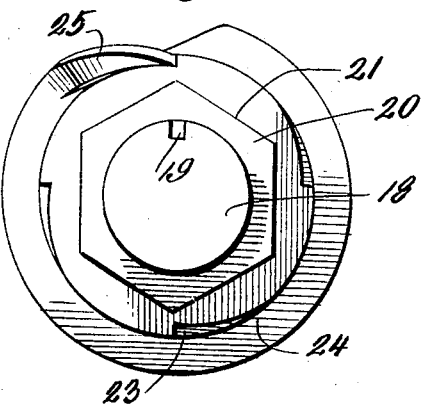
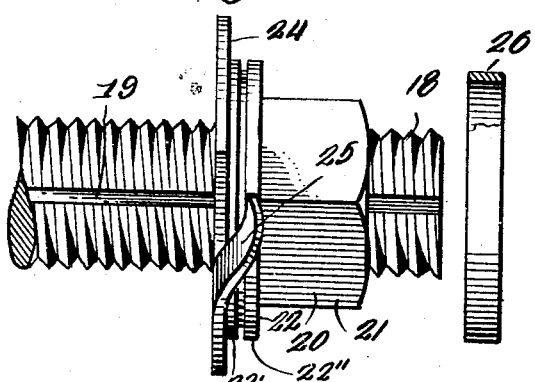
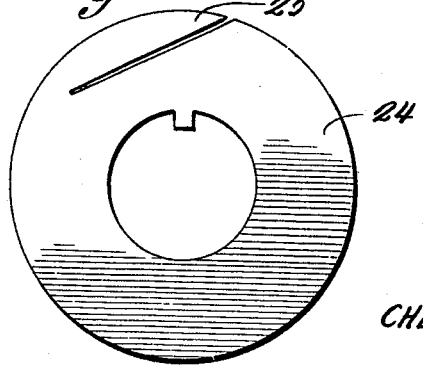
WITNESSES
Guy M. Spring
J. P. Campbell
Inventor
CHESTER A. WOODEN
By Richard B. Owen
Attorney

UNITED STATES PATENT OFFICE.

CHESTER A. WOODEN, OF LANSING, MICHIGAN.

NUT-LOCK.

1,316,344. Specification of Letters Patent. Patented Sept. 16, 1919.

Application filed October 1, 1917. Serial No. 194,241.

*To all whom it may concern:*

Be it known that I, CHESTER A. WOODEN, a citizen of the United States, residing at Lansing, in the county of Ingham and State of Michigan, have invented certain new and useful Improvements in Nut-Locks, of which the following is a specification.

This invention has relation to nut locks, and the nature and objects thereof will be readily apparent to those skilled in the art to which it appertains, in the light of the following explanation of the accompanying drawings, illustrating what I now believe to be the preferred embodiment, or mechanical expression of my invention, from among other forms and arrangements within the spirit of the invention or the scope of the appended claim.

However, an object of the invention is to provide a nut lock which will positively secure the nut against rotation on the bolt, and which may be re-used a number of times before it is to be discarded.

In addition to the foregoing my invention comprehends improvements in the details of construction and arrangement of the parts to be hereinafter described and particularly pointed out in the appended claim.

In the accompanying drawings in which similar and corresponding parts are designated by the same characters of reference throughout the several views in which they appear:

Figure 1, is a front elevation, and

Fig. 2 is a side elevation, and

Fig. 3 is a top plan of the washer.

In the drawings the numeral 18 designates the threaded shank of a bolt which has a longitudinal groove 19 formed therein. A nut 20 is adapted to be received upon the threaded shank 18 and is formed with a polygonal portion 21 and an enlarged circular portion 22. The enlarged circular portion 22 has an annular groove formed in its periphery thereby forming a pair of collars indicated by the numerals 22' and 22". The collar 22" has a plurality of circumferentially spaced notches 23 formed in its outer periphery for a purpose as will be presently described.

A washer 24 is adapted to be received on the threaded shanks of the bolt and is provided with a lug, extending into the center bore, and adapted to be received in the longitudinally extending groove 19 formed in the threaded shank 18 of the bolt. This washer 24 is furthermore provided with a segmental peripheral slot to define a tongue 25 which is adapted to be bent out of the plane of the washer, over the outer edge of the collar 22', and engage in one of the notches formed in the periphery of the collar 22".

A band is indicated at 26 and may be used, when desired, to space the washer 24 from the articles through which the bolt passes or at times might be placed between the washer and nut. This band forms no essential part of my invention but is only used in places where a space might be left between the article through which the bolt passes and the face of the washer. Or, as above stated, the band might be placed between the washer and the nut when the threaded portion of the bolt did not extend to the object through which the bolt passes.

From the above detailed description it is thought that the advantages and mode of using my nut lock will be clearly understood. When in use the bolt is passed through the object upon which it is used and the washer is then positioned upon the bolt. The nut is then screwed upon the threaded portion of the bolt until it engages the face of the washer. The tongue 25 is then bent out of the plane of the washer, over the outer edge of the collar 22', and engaged in the notches formed in the outer periphery of the collar 22". When the tongue is engaged in the notches it will prevent the nut from working loose and coming off of the bolt. The collar 22' is provided so that the tongue may be easily disengaged from the notches when it is desired to remove the nut. It will be seen that by merely pressing on the tongue it will be disengaged from the notch and at the same time the collar 22' leaves sufficient space so that it is not necessary to force the tongue entirely back within the plane of the washer as would be necessary if the notches extended into or through the collar 22'. In other words when removing the nut it is only necessary to depress the tongue sufficiently to release it from the notches in the collar 22" and as the collar 22' is round the nut may be rotated at will. If the collar 22' was not provided it would be necessary to force the tongue back in the plane of the washer and hold it in that position until the nut was partly removed. It will be seen that I have provided a nut which is simple and inexpensive in construction and one which may be used over and over a number of times.

Having fully described my invention what I claim as new and desire to secure for Letters Patent is:—

A nutlock comprising in combination, a bolt having a longitudinal groove, a nut engageable upon the shank of the bolt, a cylindrical enlargement formed upon one end of the nut having its periphery formed with an annular groove defining a pair of spaced collars, the inner collar having its periphery formed with a plurality of notches, a washer adapted to be received on the bolt and engage the enlarged face of the nut, a lug formed on the washer and extending into the bore thereof and adapted to be received in the longitudinal groove of the bolt, and a flexible tongue formed on the outer periphery of the washer, said tongue adapted to be bent from the plane of the washer, over the outer collar of the enlarged end of the nut, and engage one of the notches in the inner collar of the nut.

In testimony whereof I affix my signature in presence of two witnesses.

CHESTER A. WOODEN.

Witnesses:
  NED E. McLAUGHLIN,
  JOHN L. BUSH.

Copies of this patent may be obtained for five cents each, by addressing the "Commissioner of Patents, Washington, D. C."